(12) United States Patent
Okada et al.

(10) Patent No.: US 7,868,111 B2
(45) Date of Patent: Jan. 11, 2011

(54) METHOD FOR PRODUCING α-OLEFIN POLYMER

(75) Inventors: Toshio Okada, Fuzisawa (JP); Yoshihiro Gohshi, Yokosuka (JP); Tamiko Suga, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 440 days.

(21) Appl. No.: 11/578,633

(22) PCT Filed: Apr. 19, 2005

(86) PCT No.: PCT/JP2005/007760
§ 371 (c)(1),
(2), (4) Date: Oct. 17, 2006

(87) PCT Pub. No.: WO2005/103092
PCT Pub. Date: Nov. 3, 2005

(65) Prior Publication Data
US 2007/0208151 A1    Sep. 6, 2007

(30) Foreign Application Priority Data
Apr. 20, 2004  (JP)  .............................. 2004-124229

(51) Int. Cl.
*C08F 4/12* (2006.01)
(52) U.S. Cl. ........................ 526/226; 526/177; 526/182; 526/237; 528/482; 585/512; 585/525; 585/823
(58) Field of Classification Search .................. 526/182, 526/177, 226, 237
See application file for complete search history.

(56) References Cited

U.S. PATENT DOCUMENTS

| | | | |
|---|---|---|---|
| 4,151,113 A * | 4/1979 | Thaler | 502/153 |
| 5,414,177 A * | 5/1995 | Chung et al. | 585/512 |
| 5,739,267 A | 4/1998 | Fujisawa et al. | |
| 6,084,144 A | 7/2000 | Takashima et al. | |
| 6,476,284 B1 | 11/2002 | Ohashi et al. | |
| 7,365,152 B2 * | 4/2008 | Rath et al. | 528/482 |

FOREIGN PATENT DOCUMENTS

| | | | |
|---|---|---|---|
| CN | 1300298 | | 6/2001 |
| DE | 10361633 | * | 12/2003 |
| EP | 0 752 429 A1 | | 1/1997 |
| JP | 59-209644 | | 11/1984 |
| JP | S59-209644 | | 11/1984 |
| JP | 61-51009 | | 3/1986 |
| JP | 1-261405 | | 10/1989 |
| JP | H01-261405 | | 10/1989 |
| JP | 8-73517 | | 3/1996 |
| JP | 2000-239319 | | 9/2000 |
| JP | 2004-203922 | | 7/2004 |

OTHER PUBLICATIONS

English translation of the International Preliminary Examination Report (Chapter I) of corresponding PCT Application No. PCT/JP2005/007760 (Form PCT/IB/338).

* cited by examiner

*Primary Examiner*—Patrick Ryan
*Assistant Examiner*—Ladan Mohaddes
(74) *Attorney, Agent, or Firm*—Weingarten, Schurgin, Gagnebin & Lebovici LLP

(57) ABSTRACT

The present invention provides a method for producing α-olefin polymer, comprising polymerizing α-olefins in the presence of a halogen atom-containing acid catalyst by use of an aliphatic hydrocarbon having 3-12 carbon atoms, which contains 5 to 95 mass % of α-olefin, as a raw material; removing catalyst residue and halogen-containing compounds by bringing a product in the polymerization step into contact with an aluminum atom-containing inorganic solid treatment agent with or without deactivating the catalyst; and separating the α-olefin polymer. According to this method, the catalyst residue and other halogen-containing compounds can be removed, without relying on aqueous deactivation and separation steps using an alkaline aqueous solution or the like, from a polymerization reaction product obtained by polymerization in the presence of a halogen-containing acid catalyst by use of an α-olefin-containing liquid hydrocarbon as a raw material.

6 Claims, No Drawings

METHOD FOR PRODUCING α-OLEFIN POLYMER

This application is a §371 national phase filing of PCT/JP2005/007760 filed Apr. 19, 2005, and claims priority to Japanese application No. 2004-124229 filed Apr. 20, 2004.

BACKGROUND OF THE INVENTION

Technical Field

The present invention relates to a method for removing catalyst residue and halogen-containing compounds from a polymerization product in a method for producing α-olefin polymer in the presence of a halogen-containing acid catalyst by use of an α-olefin-containing aliphatic hydrocarbon having 3 to 12 carbon atoms, as a raw material.

Background Art

Conventionally, after cation polymerization of α-olefins using a halogen atom-containing acid catalyst such as $AlCl_3$, $BF_3$ or $TiCl_4$, the polymerization reaction product is treated with an aqueous treatment agent such as an alkaline aqueous solution, an acidic aqueous solution or water to deactivate and extract/remove the catalyst out of the system, the resulting α-olefin polymer is successively separated and recovered by distillation and, further, removal of trace amounts of catalyst residue and halogen-containing compounds in the polymer is performed as needed.

Such a conventional deactivation and removal method of catalyst using aqueous treatment agent has disadvantages such as a low recovery rate of an organic layer containing the polymer due to poor separation efficiency of organic layer from aqueous layer, and necessity of removal of colloidal metal hydroxides, which are precipitated in a case of using an alkaline aqueous solution for deactivation of metal halide catalyst. Further, drainage treatment facilities therefore must be provided. If the catalyst is soluble to hydrocarbons to be provided to the polymerization step and to the resulting product, trace amounts of metal halide catalyst is left in the hydrocarbons and the product, which can make it difficult to perform the deactivation and separating removal using aqueous treatment agent such as alkaline aqueous solution with high efficiency. Particularly, unless the moisture removal can be perfectly performed in the deactivation and separating removal of the catalyst using aqueous treatment agent, the control of polymerization reaction is difficult, when recovering and reusing hydrocarbons containing unreacted α-olefins as a polymerization raw material, because of interaction of the moisture contained in the reused raw material with the catalyst. Further, the removal of halogen-containing compounds contained in the polymerization reaction product cannot be perfectly performed only with the aqueous treatment agent, and a different step for removing the halogen-containing compounds is needed when using for electric and electronic applications, food applications and the like having strict standards for halogen concentration in polymers.

To solve these problems, it is proposed to, in cation polymerization using a catalyst containing halogen atom and metal atom, perform ligand replacement after the polymerization, and then remove a component containing halogen atom in a nonaqueous system, or to perform dehydrochlorination (de-HCl reaction) of polymerization terminal simultaneously with the ligand replacement (e.g., see Japanese Patent Application Laid-Open No. 8-73517 (Equivalent: U.S. Pat. No. 5739267)). The application of these methods enables omission of the step of removing halogen since the catalyst can be deactivated and removed without contact with water, but needs a step for removing catalyst-derived complexes produced by the ligand replacement.

DISCLOSURE OF INVENTION

An object of the present invention is to provide a polymerization method of α-olefins, capable of performing removal of catalyst residue and other halogen-containing compounds, without relying on aqueous deactivation and separation steps using an alkaline aqueous solution or the like, from a polymerization reaction product containing α-olefin polymer, hydrocarbons such as unreacted α-olefins, the catalyst residue, the halogen-containing compounds and the like, the polymerization reaction product being obtained by polymerization reaction in the presence of a halogen-containing acid catalyst by use of an α-olefin-containing liquid hydrocarbon as a raw material.

A method for producing α-olefin polymer according to the first aspect of the present invention comprises steps of polymerizing α-olefins in the presence of a halogen atom-containing acid catalyst by use of an aliphatic hydrocarbon having 3 to 12 carbon atoms, which contains 5 to 95 mass % of α-olefin, as a raw material (polymerization step); removing catalyst residue and halogen-containing compounds by bringing a product in the polymerization step into contact with an aluminum atom-containing inorganic treatment agent with or without deactivating the catalyst (removal step); and separating the α-olefin polymer from the product subjected to the treatment in the removal step (separation step).

According to the second aspect of the present invention, in the method for producing α-olefin polymer of the first aspect of the present invention, the α-olefin includes isobutylene, and the α-olefin polymer includes polyisobutylene.

According to the third aspect of the present invention, in the method for producing α-olefin polymer of the first or second aspect of the present invention, the halogen atom-containing acid catalyst comprises either one of the following formulae (1) and (2).

$$AlR_mX_n \qquad (1)$$

wherein R represents an alkyl group having 1 to 8 carbon atoms, X represents a halogen atom, m represents an integer of 1 to 3, and n represents an integer of 0 to 2, with the relation of m+n=3.

$$Al_2R_pX_q \qquad (2)$$

wherein R represents an alkyl group having 1 to 8 carbon atoms, X represents a halogen atom, p represents an integer of 1 to 6, and q represents an integer of 0 to 5 with the relation of p+q=6.

According to the fourth aspect of the present invention, in the method for producing α-olefin polymer of any one of the first to third aspects of the present invention, the halogen atom-containing acid catalyst is dissolved in any one of hydrocarbons provided to the polymerization step.

According to the fifth aspect of the present invention, in the method for producing α-olefin polymer of any one of the first to fourth aspects of the present invention, the halogen atom-containing acid catalyst is ethyl aluminum dichloride.

According to the sixth aspect of the present invention, in the method for producing α-olefin polymer of any one of the first to fifth aspects of the present invention, the aluminum atom-containing treatment agent includes an inorganic solid treatment agent containing a component represented by the composition formula $Al_2O_3$.

According to the seventh aspect of the present invention, in the method for producing α-olefin polymer of any one of the first to sixth aspects of the present invention, the aluminum atom-containing treatment agent includes alumina.

According to the eighth aspect of the present invention, in the method for producing α-olefin polymer of any one of the first to seventh aspects of the present invention, a step for extracting and separating the halogen atom-containing acid catalyst residue with an aqueous treatment agent is not involved after the polymerization step.

According to the ninth aspect of the present invention, the method for producing α-olefin polymer of any one of the first to eighth aspects of the present invention, the halogen concentration of the α-olefin polymer after the separation step is not more than 5 ppm.

According to the method of the present invention, the halogen atom-containing acid catalyst residue and halogen-containing compounds derived therefrom can be easily collectively removed. Not only the deactivation, extraction and removing steps using an aqueous treatment agent such as an alkaline aqueous solution which were conventionally practiced, but also drainage treatment of the extracted water and the removal step of the halogen-containing compounds from the α-olefin polymer can be dispensed with. When the unreacted raw material is recovered and reused, the control of polymerization is facilitated since no moisture is contained in the recovered raw material. Further, the above-mentioned effects can be particularly remarkably obtained in application to a polymerization method using a catalyst soluble to hydrocarbons.

BEST MODE FOR CARRYING OUT THE INVENTION

The present invention will be further described in detail.

The raw material used in the present invention is an aliphatic hydrocarbon having 3 to 12 carbon atoms, which contains 5 to 95 mass % of α-olefin. This raw material can be kept in a liquid state in the internal pressure and temperature ranges of a polymerization reaction system.

Preferable examples of the α-olefin include 1-butene, 2-methyl-1-butene (isobutylene), 3-methyl-1-butene, 1-pentene, 1-hexene, vinyl cyclohexane, 4-methyl-1-pentene, 2,4,4-trimethyl-1-pentene, 1-decene, and 1-dodecene. Among them, α-olefins having 4 carbon atoms represented by isobutylene are most preferable from the viewpoints of the reactivity, the easiness to keep the reaction system and hydrocarbons containing polymers in a liquid state, and the like.

A content of α-olefin in the raw material of less than 5 mass % cannot ensure a commercial production efficiency of α-olefin polymer, while a content exceeding 95 mass % is not preferred since the viscosity of the reaction system can be excessively increased by the α-olefin polymer produced in a large quantity, if it has a large average molecular weight, to hinder the operation of the following catalyst removal step. For example, to produce polymers having number average molecular weights of 1500 to 10000 (polybutene) from a hydrocarbon raw material containing isobutylene, the isobutylene concentration is preferably within the range of from 10 to 60 mass %, and further preferably within the range of from 15 to 45 mass %.

Such a polymerization raw material to be used may be prepared by commercially acquiring and adjusting each component, but a one obtained as a fraction from petroleum refinery or petrochemical industry can be also used. Examples of hydrocarbons containing α-olefins having 4 carbon atoms, for example, include a residual content (butadiene raffinate) obtained by removing butadiene, by extraction distillation or the like, from a $C_4$ fraction distilled from a cracker for thermally cracking hydrocarbon such as naphtha, kerosene, light oil or butane or from a fluid catalytic cracking (FCC) apparatus for catalytic cracking, for production of lower olefins such as ethylene and propylene. The raffinate generally contains, as α-olefins, 10 to 15 mass % of isobutylene and 10 to 15 mass % of 1-butene, with butadiene being not more than 0.5 mass %. Of course, the raffinate can be used with addition of $C_3$ to $C_{12}$ α-olefin hydrocarbons, or with dilution with $C_3$ to $C_{12}$ hydrocarbons.

The number average molecular weight of the α-olefin polymer is not limited as long as it is within the range enabling the treatment of the product in the polymerization step in the following catalyst removal step and separation step while keeping the liquid state. Commercially, polymers with number average molecular weights of 120 to 50000 or more can be preferably produced.

For example, isobutylene polymers including a wide range of from oligomer with number average molecular weight of 120 to 500, viscous polymers with number average molecular weight of 1500 to 10000 and semi-solid polymers with number average molecular weight of 50000 or more can be obtained from a raw material containing 15 to 45 wt. % of isobutylene. Of course, polymers of intermediate areas thereof can be obtained according to the uses.

As the halogen-containing acid catalyst in the present invention, any known Lewis acid catalyst for cation polymerization of α-olefin can be used without particular limitation. Examples thereof included a Lewis acid catalyst containing chlorine or fluorine as halogen atom or complex catalysts thereof (U.S. Pat. Nos. 4152499, 5408018, and 5068490). The catalyst may be supplied after diluted with a proper solvent, for example, normal hexane, normal heptane, isooctane, cyclohexane, cyclododecane, toluene, benzene, dichloromethane, methyl chloride, ethyl chloride, or the like, and as an activating agent, for example, HCl, t-butyl chloride, water or the like may be supplied thereto as occasion demands. The amount used is preferably set to $0.5 \times 10^{-5}$ to $1.0 \times 10^{-2}$ (mol/mol) to the α-olefin in the raw material.

Preferable catalysts usable in the present invention are represented by the following formula (1) or (2). These have high solubility to hydrocarbon and thus high efficiency as catalyst, and are easy to remove by contact with an aluminum atom-containing treatment agent described below.

$$AlR_mX_n \tag{1}$$

wherein R represents an alkyl group having 1 to 8 carbon atoms, X represents a halogen atom, m represents an integer of 1 to 3, and n represents an integer of 0 to 2, with the relation of m+n=3.

$$Al_2R_pX_q \tag{2}$$

wherein R represents an alkyl group having 1 to 8 carbon atoms, X represents a halogen atom, p represents an integer of 1 to 6, and q represents an integer of 0 to 5 with the relation of p+q=6.

Particularly preferable catalysts among them include $CH_3AlCl_2$, $(CH_3)_2AlCl$, $C_2H_5AlCl_2$, $(C_2H_5)_2AlCl$, $(C_2H_5)_3Al_2Cl_3$, $(CH_3)_3CAlCl_2$, and $[(CH_3)_3C]_2AlCl$. Particularly preferable is $C_2H_5AlCl_2$ (ethyl aluminum dichloride).

Since the halogen-containing catalyst is adsorptively removed mainly by contact with the aluminum atom-containing treatment agent in the present invention, it is not impeditive that the catalyst is dissolved, and the α-olefin production process can be extremely simplified without needing any special extraction removal step.

In the present invention, halides such as the halogen-containing catalyst are removed by bringing a polymerization reaction product containing α-olefin polymer, unreacted hydrocarbons, and catalyst residue into contact with a treatment agent containing aluminum atom. To enhance the contact efficiency, the product is preferably brought into contact as a liquid phase by pressurization when hydrocarbons having not more than 5 carbon atoms are contained therein.

The aluminum-atom containing treatment agent is preferably an inorganic solid treatment agent containing a component represented by the composition formula $Al_2O_3$. Any natural or synthetic inorganic materials can be used as far as they contain the component represented by $Al_2O_3$. Concrete examples of the inorganic solid treatment agent include, for example, activated alumina which is used for adsorption of organic matters. This agent may be molded by use of a proper binder. For example, a one obtained by properly pulverizing and classifying commercially available alumina can be used. Further, the alumina can be modified by being made to properly support alkali metal, alkali earth metal or other metals in a form of oxide, hydroxide or others by impregnation or other methods, as far as the effect of the present invention is not arrested. In general, however, such support and modification are not particularly needed, and alumina with a content of alkali metal such as sodium or alkali earth metal of not more than 0.5 wt % is used. Such an alumina which is never or hardly subjected to such support and modification is inexpensive, and the method of the present invention is useful from this point. The physical properties of the aluminum atom-containing treatment agent are preferably selected in relation to the contact efficiency with the halogen-containing compound and the pressure loss given to the process, and the treatment agent preferably has a surface area of 1 to 500 $m^2/g$, preferably 50 to 400 $m^2/g$, a capacity per ml of 0.50 to 0.88 g, and a porosity of 50 to 70%. As activated alumina corresponding thereto, for example, A-201, D-201, A-2, and A-203Cl manufactured by UOP are commercially available.

When unreacted α-olefins are present in the product of the polymerization step and/or when the catalyst is not deactivated, the influence on polymerization reaction or the like of the interaction of the aluminum atom-containing solid inorganic treatment agent of the present invention and α-olefin with polymer activated terminal and/or catalyst is not substantially recognized.

The temperature in the contact of the product from the polymerization step with the aluminum atom-containing solid inorganic treatment agent such as alumina is varied depending on the kind of the treatment agent, but is preferably within the range of 0 to 400° C., and more preferably within the range of 20 to 300° C. A treatment temperature higher than this range is not preferable since decomposition of the α-olefin polymer is started, although the catalyst residue and chlorine-containing compounds such as halogen are removed. At a temperature lower than it, removal of the catalyst residue and the like is insufficient.

The contact time of the polymerization reaction product with the aluminum atom-containing solid inorganic treatment agent such as alumina is not particularly limited as far as the catalyst reside and the chlorine halogen-containing compounds can be removed. Generally, the contact time is set preferably to the range of about 1 minute to 10 hours. When the contact time is shorter than this range, the catalyst residue and chlorine halogen-containing compounds are not sufficiently removed because of insufficient contact, and when the contact time is longer, the facility cost is unpreferably increased. As the method for the contact, both batch type and continuous type can be adapted. In the continuous type, fixed bed and fluidized bed are usable. As the flow direction, both up flow and down flow can be adapted.

After the contact treatment with the alumina-containing solid inorganic treatment agent for removal of the catalyst residue and halogen-containing compounds, unreacted α-olefins and hydrocarbons are removed by proper distillation, whereby the α-olefin polymer can be obtained. The thus-obtained α-olefin polymer can be further divided to desired molecular weights by further proper distillation. A butene polymer with an aluminum concentration of not more than 5 wt ppm and a chlorine concentration of 5 wt ppm can be obtained in the α-olefin polymer obtained through the polymerization step, catalyst removal step and separation step according to the method of the present invention by use of an isobutylene-containing raw material and ethyl aluminum dichloride. The resulting butene polymer or modified matters thereof can be burnt with minimized release of chlorine to the atmosphere because it is substantially free from chlorine, and the method of the present invention is therefore useful also from the point of environmental preservation. With respect to the deactivation and removal of catalyst, there is a merit that the drainage treatment which is needed in the industrially practiced contact with water or alkaline aqueous solution is not involved. Further, the simultaneous removal of catalyst and chlorine can dispense with a separate chlorine removing step, and this method is useful also from the point of process.

In a production method of α-olefins with partial or entire circulation of unreacted hydrocarbons to a reaction system, it is necessary to provide a dehydration step prior to the introduction into the reaction system, since the moisture consequently included in the reaction system in the extraction removal step by alkali water or the like is generally circulated to the reaction system with the hydrocarbons separated from the α-olefin polymer by distillation step. In the present invention, no special extraction removal step is needed since the halogen-containing catalyst and halogen-containing compounds are mainly removed by the contact with the aluminum atom-containing treatment agent, and the entrainment of moisture to the recovered unreacted hydrocarbons can be avoided in some cases since the extraction removal step using alkaline water or the like can be omitted. Even in combination with a deactivation and removal step of catalyst using aqueous treatment agent, the content of moisture can be reduced since the dehydration can be performed by the contact with the aluminum atom-containing treatment agent, and the α-olefin production process can be thus extremely simplified. When the separated unreacted hydrocarbons and the like are used as raw materials or the like for other production facilities, also, the same effect can be obtained.

Further, the halogen-containing compounds in the polymer reaction product containing α-olefin polymer and unreacted hydrocarbons, to be provided to the aluminum atom-containing treatment agent, include such as those resulted from impurities in the raw material and hydrogen chloride added for the purpose of molecular weight control, in addition to those mainly resulted from the halogen-containing catalyst. These halogen-containing compounds can be also removed by the method of the present invention. In addition to the above-mentioned halogen-containing catalyst and the like, compounds which can affect the commodity value of α-olefin compounds such as hetero atom compounds containing oxygen, phosphorus or the like and aromatic compounds can be also removed in the present invention.

EXAMPLES

Example 1

(Polymerization step)

The raw material was prepared by diluting a residual fraction after extracting butadiene from a $C_4$ fraction obtained from an ethylene production plant by naphtha cracking with isobutane. The raw material composition analyzed by gas chromatography is shown in Table 1. This raw material was supplied to an autoclave with an inner volume of 200 ml at a rate of 240 g per hour, and ethyl aluminum dichloride diluted with normal hexane was separately supplied in a ratio of 0.5 mmol to 1 mmol of isobutylene in the raw material to continuously perform polymerization at a reaction pressure of 0.2 MPa and a reaction temperature of −15° C.

TABLE 1

| Component | Content Ratio (wt %) |
|---|---|
| Isobutylene | 30.3 |
| 1-Butene | 13.9 |
| 2-Butene | 6.4 |
| n-Butane | 6.5 |
| Isobutane | 42.9 |
| Butadiene | Trace |
| Total | 100.0 |

(Removal step of halogen compounds such as catalyst)

To a fixed bed container with an inner volume of 15 ml, 10 g of activated alumina (manufactured by UOP LCC, Commercial Name: A203-CL) which was pulverized and classified to a grain size of 0.5 mm to 1.0 mm was filled. The polymerization solution obtained in the polymerization step was supplied to this filled container to perform removal of halogen compounds such as catalyst with a treatment condition of 200° C., WHSV=1 $h^{-1}$. After the treatment, unreacted $C_4$ components were removed by distillation to obtain a butene polymer. The aluminum concentration and chlorine concentration of the resulting butene polymer were measured by ICP emission spectrometry and by coulometric titration, respectively. The aluminum concentration was 1 ppm by mass, and the chlorine concentration was 5 ppm by mass.

Comparative Example 1

The polymerization solution obtained according to the (polymerization step) of Example 1 was treated with 2% NaOH aqueous solution to deactivate and remove the catalyst, further washed with deionized water three times, and dried, and unreacted $C_4$ components were removed by distillation, whereby a butene polymer was obtained. The aluminum concentration of this butene polymer was 1 wt ppm while the chlorine concentration was 60 wt ppm. This chlorine content level needs further step for removing chlorine. Since the 2% NaOH aqueous solution after used for the deactivation and removal of catalyst contains colloidal oxide precipitates, the aqueous solution could not be disposed without removal thereof.

INDUSTRIAL APPLICABILITY

The method of the present invention has the merit that the deactivation and removal of catalyst does not involve the drainage treatment which is performed in the industrially practiced contact with water or alkaline aqueous solution. Further, since the halogen in the catalyst and in the polymer, preferably, chlorine can be simultaneously removed, this method is useful from the point of process without needing any different chlorine removal step. Since the butene polymer obtained by the method of the present invention is substantially free from chlorine, the resulting butene polymer or modified matters thereof can be burnt with minimized release of chlorine to the atmosphere, and this method is thus useful from the point of environmental preservation. Therefore, the method of the present invention can be extensively used in industrial fields.

The invention claimed is:

1. A method for producing α-olefin polymer, comprising steps of:
   polymerizing α-olefins in a reaction mixture comprising a halogen atom-containing acid catalyst and an aliphatic hydrocarbon having 3-12 carbon atoms, which contains 5 to 95 mass % of α-olefin, as a raw material (polymerization step);
   removing adsorptively most of the catalyst residue and simultaneously removing adsorptively halogen-containing compounds by bringing the reaction mixture into contact with activated alumina without treating the reaction mixture with an aqueous treatment agent after the polymerization step (removal step); and
   separating the α-olefin polymer from the product of the removal step (separation step);
   wherein said halogen atom-containing acid catalyst comprises a compound according to either formula (1) or formula (2):

$$AlR_mX_n \quad (1)$$

wherein R represents an alkyl group having 1 to 8 carbon atoms, X represents a halogen atom, m represents 1 or 2, and n represents 1 or 2, with the relation of m+n=3;

$$Al_2R_pX_q \quad (2)$$

wherein R represents an alkyl group having 1 to 8 carbon atoms, X represents a halogen atom, p represents an integer of 1 to 5, and q represents an integer of 1 to 5 with the relation of p+q=6.

2. The method for producing α-olefin polymer according to claim 1, wherein said α-olefin includes isobutylene, and said α-olefin polymer includes polyisobutylene.

3. The method for producing α-olefin polymer according to claim 1, wherein said halogen atom-containing acid catalyst is dissolved in an aliphatic hydrocarbon provided in the polymerization step.

4. The method for producing α-olefin polymer according to claim 1, wherein said halogen atom-containing acid catalyst is ethyl aluminum dichloride.

5. The method for producing α-olefin polymer according to claim 1, wherein the halogen concentration of said α-olefin polymer after the separation step is not more than 5 ppm.

6. The method for producing α-olefin polymer according to claim 2, wherein:
   said halogen atom-containing acid catalyst is dissolved in an aliphatic hydrocarbon provided in the polymerization step;
   said halogen atom-containing acid catalyst is ethyl aluminum dichloride; and
   the halogen concentration of said α-olefin polymer after the separation step is not more than 5 ppm.

* * * * *

UNITED STATES PATENT AND TRADEMARK OFFICE
CERTIFICATE OF CORRECTION

PATENT NO. : 7,868,111 B2
APPLICATION NO. : 11/578633
DATED : January 11, 2011
INVENTOR(S) : Toshio Okada et al.

Page 1 of 1

It is certified that error appears in the above-identified patent and that said Letters Patent is hereby corrected as shown below:

Title page (75) Inventors, reads as follows:
"Toshio Okada, Fuzisawa (JP);
Yoshihiro Gohshi, Yokosuka (JP);
Tamiko Suga, Yokohama (JP)"

should read as follows:

--Toshio Okada, Fuzisawa-shi (JP);
Yoshihiro Goshi, Yokosuka-shi (JP);
Tamiko Suga, Yokohama-shi (JP)--;

and

Column 4, line 39, "$0.5 \times 10^{31\ 5}$ to $1.0 \times 10^{31\ 2}$" should read as follows: --$0.5 \times 10^{-5}$ to $1.0 \times 10^{-2}$--.

Signed and Sealed this
Seventeenth Day of April, 2012

David J. Kappos
*Director of the United States Patent and Trademark Office*